United States Patent

[11] 3,572,862

[72] Inventor Hiroshi Teramachi
Tokyo, Japan
[21] Appl. No. 866,971
[22] Filed Oct. 16, 1969
[45] Patented Mar. 30, 1971
[73] Assignee Nippon Thompson Co. Ltd.
Tokyo, Japan

[54] THRUST ROLLER BEARING
1 Claim, 11 Drawing Figs.
[52] U.S. Cl. .................................................. 308/235
[51] Int. Cl. .................................................. F16c 33/38
[50] Field of Search .................................................. 308/235, 217, 216

[56] References Cited
UNITED STATES PATENTS
2,978,282 4/1961 Fisher.......................... 308/235

Primary Examiner—Fred C. Mattern, Jr.
Assistant Examiner—Frank Surko
Attorney—Wenderoth, Lind & Ponack ABSTRACT: A thrust roller bearing in which an annular flat plate is used as an intermediate guide plate whereby rollers are guided always precisely and the contact area between each roller and guide plates is minimized to provide highly smooth rotation of the rollers, and which is less expensive to manufacture.

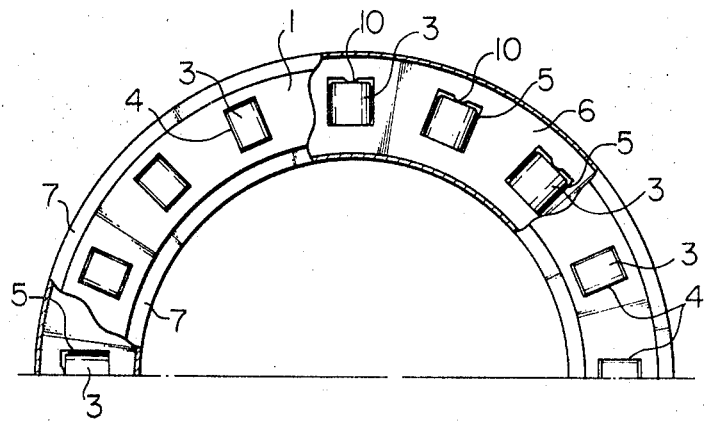
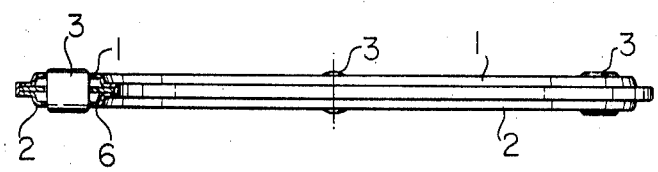
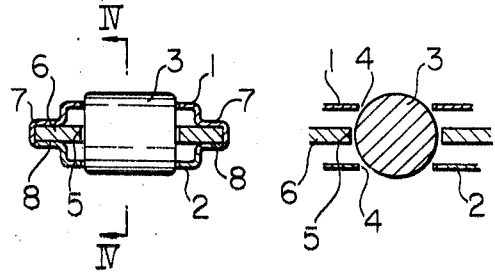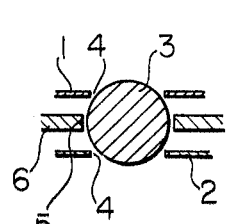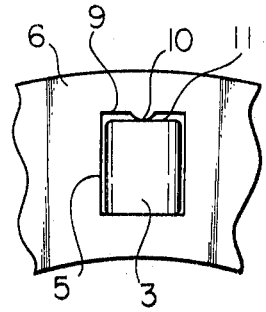

THRUST ROLLER BEARING

BACKGROUND OF THE INVENTION

1. Field of the Invention

This invention relates to a thrust roller bearing, and more particularly to an improved thrust roller bearing in which rollers are guided always precisely and the contact area between rollers and guide plates is minimized to provide an enhanced accuracy of the roller rotation.

2. Description of the Prior Art

In the past, thrust roller bearings have been known in which rollers are interposed between upper and lower plates for holding and guiding the rollers. In the construction using such guide plates, each roller is guided by the edges of two openings formed in the upper and lower guide plates. This has not only caused a great contact area to be provided between each roller and the guide plates but also given rise to the tendency of the rotating rollers to slip off the guide openings into the space between the upper and lower guide plates because the rollers are guided for rotation at two upper and lower surface portions thereof diametrically opposite to each other. Also, in the known construction of the above-described type in which the contact area between the rollers and the two guide plates is utilized to guide the rollers, it has structurally been very difficult to minimize the irregular displacement of the rollers within the width of the openings formed in the upper and lower guide plates. These inconveniences have led to a disadvantage that the accurate rotation of the rollers cannot be effected smoothly. Furthermore, the rollers incorporated in the known thrust roller bearings of the described type have often been of the type which has spherical end faces, whereas such spherical construction of the roller end faces is more expensive when the diameter of the rollers in use is greater.

SUMMARY OF THE INVENTION

It is the primary object of the present invention to eliminate these drawbacks existing in the known thrust roller bearings and provide improved thrust roller bearings in which rollers are guided always precisely and the contact area between each roller and guide plates is minimized to provide an enhanced accuracy of the roller rotation and which are less expensive to manufacture because of the simplified construction of the rollers.

According to the present invention there is provided a thrust roller bearing which comprises a pair of upper and lower annular outer guide plates formed with equally spaced radial openings for holding therebetween rollers having flat end faces, and an intermediate guide plate interposed between said outer guide plates and formed with guide openings allowing said rollers to rotate therewithin so that the rollers may be guided for rotation with the side surface thereof contacted by the opposite side edges of said guide openings formed in said intermediate guide plate, each of said guide openings formed in said intermediate guide plate being provided with an inwardly projected convex portion formed at the end thereof which is adjacent to the outer flat end face of the associated roller so that point contact is achieved between said convex portion and said outer flat end face of said roller, whereby said rollers can effect sliding rotation relative to said intermediate guide plate.

BRIEF DESCRIPTION OF THE DRAWINGS

The present invention will be more fully described by way of example with respect to the accompanying drawings, in which:

FIG. 1 is a partly broken away plan view showing a half of the thrust roller bearing using an annular flat plate as an intermediate plate according to an embodiment of the present invention;

FIG. 2 is a partly cross-sectional side view of the thrust roller bearing shown in FIG. 1;

FIG. 3 is an enlarged, cross-sectional view illustrating the manner of assemblage;

FIG. 4 is a fragmentary cross-sectional view taken along line IV–IV of FIG. 3;

FIG. 5 is a fragmentary, enlarged plan view of the intermediate roller guide plate used in the bearing of FIG. 1;

DESCRIPTION OF THE PREFERRED EMBODIMENTS

Figure 6:
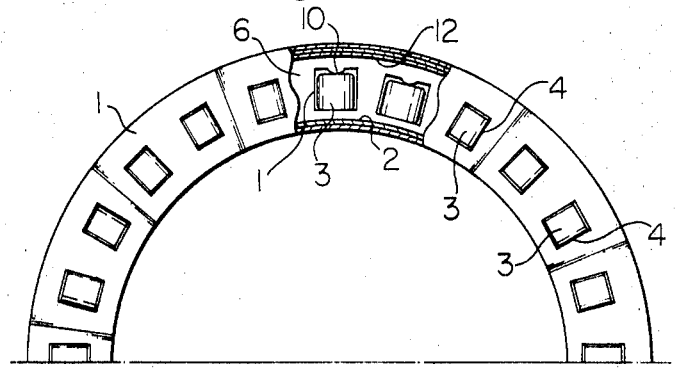
FIG. 6 is a partly broken away plan view showing a half of the thrust roller bearing using an intermediate guide plate provided with reinforcing guide members formed along the inner and outer peripheries thereof and bent in opposite directions with each other according to another embodiment of the present invention.

Referring to FIGS. 1 to 5, there is shown the thrust roller bearing provided according to a first embodiment of the present invention, in which an annular flat plate is used as an intermediate roller guide plate. The thrust roller bearing comprises annular outer guide plates 1 and 2 for holding a plurality of equally spaced rollers 3 therebetween. Each of the outer guide plates 1 and 2 is provided with a plurality of radial guide openings 4 which correspond to said plurality of rollers 3. The rollers 3 are held between said two outer guide plates 1 and 2 in such a manner that each roller 3 has the upper and lower portions of its side surface exposed through said guide openings 4 formed in the outer guide plates 1 and 2. According to this embodiment, it should be noted that an annular intermediate guide plate 6 formed with a plurality of radial guide openings 5 which also correspond to said rollers 3 is interposed between said outer guide plates 1 and 2. Each of these guide openings 5 formed in the intermediate guide plate 6 has dimensions allowing the roller 3 to rotate therewith. The intermediate guide plate 6 interposed between the two outer guide plates 1 and 2 is fixedly held at its both edges by and between flange portions 7 and 8 which are integrally formed along the peripheral edges of the respective outer guide plates, as best shown in FIG. 3. Each of the guide openings 5 formed in the intermediate guide plate 6 has a configuration substantially corresponding to the longitudinal cross section of the roller 3, but as shown in FIG. 5, the end surface 9 of the guide opening 5 which is adjacent to the outer periphery of the guide plate 6 is formed with an inwardly projected small convex portion 10, which effects point-contact with the flat outer end face 11 of the roller 3 inserted in the opening 5. Usually each roller 3 has its both end faces flattened.

With the above-described construction, each roller 3 while rotating is guided by the guide opening 5 with the side surface of the roller being in contact with the opposed sides of the guide opening, whereby irregular displacement of the roller 3 within the width of the guide opening 5 may be minimized and consequently the roller 3 may be guided precisely.

Also, the rotating roller 3 has its flat outer end face 11 engaged by the inwardly projected convex portion 10 formed in the guide opening 5 of the intermediate guide plate 6 and this point-contact minimizes any abnormal heat which may be produced by the sliding contact between the end face 11 and the convex portion 10. This eliminates the necessity of using rollers having spherical end faces as in the prior art, and therefore there is no fear for increased cost of manufacture even if greater-diametered rollers must be used, which in turn leads to a reduced cost of the bearing assembly.

In the conventional construction in which use is made of no other guide plate that the two outer guide plates, the rollers tend to slip off the guide openings formed in the outer guide plates to thereby interfere with the smooth rotation of the rollers, whereas according to the present invention the presence of the intermediate guide plate prevents such drawback to thereby ensure smooth rotation of the rollers at all times.

Figure 7:
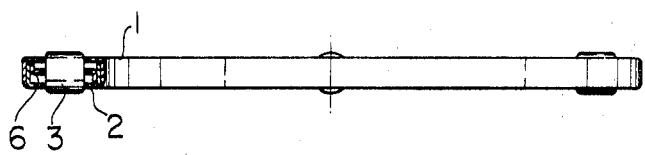
FIG. 7 is a partly cross-sectional side view of the thrust roller bearing shown in FIG. 6.
Figure 8:
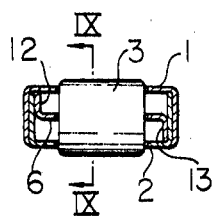
FIG. 8 is an enlarged sectional view illustrating the manner of assemblage.
Figure 9:
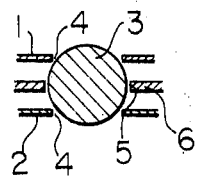
FIG. 9 is a fragmentary cross-sectional view taken along line IX–IX of FIG. 8.
Figure 10:
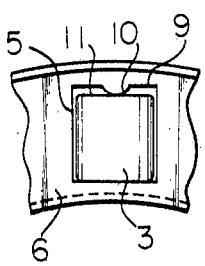
FIG. 10 is a fragmentary, enlarged plan view of the intermediate guide plate used in the bearing of FIG. 6.
Figure 11:
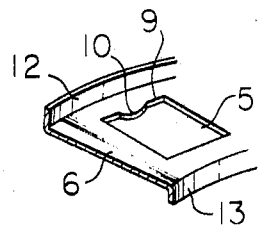
FIG. 11 is a fragmentary perspective view of the intermediate guide plate.

Turning to FIGS. 6 to 11, there is shown a second embodiment of the present invention in which use is made of a different intermediate plate 6. More specifically, the intermediate guide plate 6 in this embodiment has its outer and inner peripheral edges bent in opposite directions so as to form reinforcing guide members 12 and 13 respectively, as best seen in FIGS. 7 and 8. These reinforcing guide members 12 and 13 of the intermediate guide plate 6 are closely held and fixed by and between the two outer guide plates 1 and 2. In the other points, the construction of this second embodiment is substantially identical with that of the previously described first embodiment and can attain the same results as those achieved by the first embodiment.

While the present invention has been shown and described with respect to the preferred embodiments thereof, it should be understood that the scope of the invention is only limited by the appended claim.

I claim:

1. A thrust roller bearing comprising a pair of upper and lower annular outer guide plates formed with equally spaced radial openings for holding therebetween rollers having flat end faces, and an intermediate guide plate interposed between said outer guide plates and formed with guide openings allowing said rollers to rotate therewithin so that the rollers may be guided for rotation with the side surface thereof contacted by the opposite side edges of said guide openings formed in said intermediate guide plate, each of said guide openings formed in said intermediate guide plate being provided with an inwardly projected convex portion formed at the end thereof which is adjacent to the outer flat end face of the associated roller so that point contact is achieved between said convex portion and said outer flat end face of said roller, whereby said rollers can effect sliding rotation relative to said intermediate guide plate.